June 9, 1942.  E. L. HURT  2,285,859
METER
Filed Feb. 1, 1939  3 Sheets-Sheet 1

Fig.1.

Inventor:
Earl L. Hurt
By Brown, Jackson, Boettcher & Dienner
Attys.

June 9, 1942. E. L. HURT 2,285,859
METER
Filed Feb. 1, 1939 3 Sheets-Sheet 2

Fig.2.
Prior Art Chart

Inventor
Earl L. Hurt
By Brown, Jackson, Boettcher & Dienner
Attys.

June 9, 1942.　　　　E. L. HURT　　　　2,285,859
METER
Filed Feb. 1, 1939　　　3 Sheets-Sheet 3

Inventor
Earl L. Hurt

Patented June 9, 1942

2,285,859

UNITED STATES PATENT OFFICE 2,285,859

METER

Earl L. Hurt, Deerfield, Ill.

Application February 1, 1939, Serial No. 253,964

13 Claims. (Cl. 234—5.5)

My invention relates generally to electrical demand meters, and it has particular relation to an improvement in demand meters of the construction disclosed in Patent No. 1,331,915 to Hall.

In the generation and sale of electric power there are, among others, two important factors determining the charge to be made therefor. These are the total quantity of power supplied and the rate at which the power is supplied. It is obvious that where the consumer has a load which is uniform and continuous, it will cost less to supply it than where the load fluctuates widely with peaks occurring therein. To have generating equipment of sufficient capacity to supply these peak loads which, except when supplying these peak loads, is idle or operating below its full load capacity and maximum efficiency, obviously is a large factor in the cost of supplying electric power. Therefore, in the sale of electric power the charge made therefor must not only be based on the quantity of power used, but also on the rate at which it is used.

Accordingly, in order to determine the charge to be made for electrical power, meters are provided for measuring both the quantity of power used and also the rates at which the power is used. The meters used for measuring the quantity of power used are commonly known as watt-hour meters, while those for measuring the rate are called demand meters. The demand meters are usually adapted to record the quantity of power supplied in a thirty-minute interval, although any other time interval may be used.

Demand meters, the construction of which is based on the disclosure of Patent No. 1,331,915 and-or the disclosure of Patent No. 1,603,050, are in wide use today. However, in practice, when these meters are used in conjunction with a recording chart it is generally not possible to get a continuous accurate record for a number of reasons. In connection with these meters, the power demand in a given period is recorded by the drawing of a full line, the demand during the given period being proportional to the length of the line. The line is drawn on a recording chart by a pointer or stylus which is advanced from its starting position, during each period, a distance proportional to the demand during that period and which returns automatically after each period to its starting position to be advanced therefrom during the next succeeding period. By having a recording chart, the zero line of which coincides with the starting position of the recording member or pointer and which is driven at such a rate that each line drawn by the pointer falls in a section on the chart provided for the period during which the line was drawn, a fairly representative record of the demand for each given period can be secured.

However, it is generally not possible to continuously have the starting position of the pointer coincide with the zero line of the recording chart. In order that the consumer cannot make the complaint that the pointer started above the zero line, thus making the reading on the chart higher than it should be, the starting position of the pointer is so adjusted that it will start from or below the zero line. Accordingly, those parts of the lines, drawn for each period, which occur below the zero line cannot be included in the reading for the respective period. This makes the readings during many of the periods smaller than they actually should be.

In addition to the inaccuracy due to the pointer starting below the zero line, whenever it is not clearly determinable which of several adjacent lines gives the highest, i. e. peak, reading, one is taken about which there is no uncertainty, even though it gives a lower reading than the actual one.

Another source of error in the demand recorded by these demand meters that is open to serious objection is the possibility of some of the demand occurring at the end of one period being recorded with the demand of the next successive period. This made it possible for the demand recorded for a period to be higher than it actually was.

An important object of my invention is to record maximum electrical demand by means of a series of discontinuous marks, i. e. dots or short dashes, instead of by a continuous line.

Another object of my invention is to provide a demand meter which will record maximum demand in such manner that its value is easily ascertainable, definite, and not open to dispute.

Another object of my invention is to record maximum demand as a series of discontinuous marks, it not being possible for any demand occurring in one period being recorded in the succeeding one.

Another object of my invention is to provide a demand meter which will record maximum demand as a series of discontinuous equally spaced apart dots, each dot or mark representing a definite increment of demand, and wherein the dots are recorded on a time-driven recording chart in regular and orderly pattern.

Another object of my invention is to provide a demand meter in which "whip" and "back-lash" introduce no error or difficulty.

Another object of my invention is to provide a demand meter in which the inaccuracy of a recording chart causes no difficulty in determining accurately the maximum demand reading.

Other objects of my invention will, in part, be obvious and in part appear hereinafter.

Accordingly, my invention is disclosed in the embodiments thereof shown in the accompanying drawings, and it comprises the features of construction, combination of parts, and arrangement of elements which will be exemplified in the constructions hereinafter set forth and the scope of the application of which will be indicated in the appended claims.

For a more complete understanding of the nature and scope of my invention, reference may now be had to the following detailed description, taken in conjunction with the accompanying drawings, in which.

Figure 1:
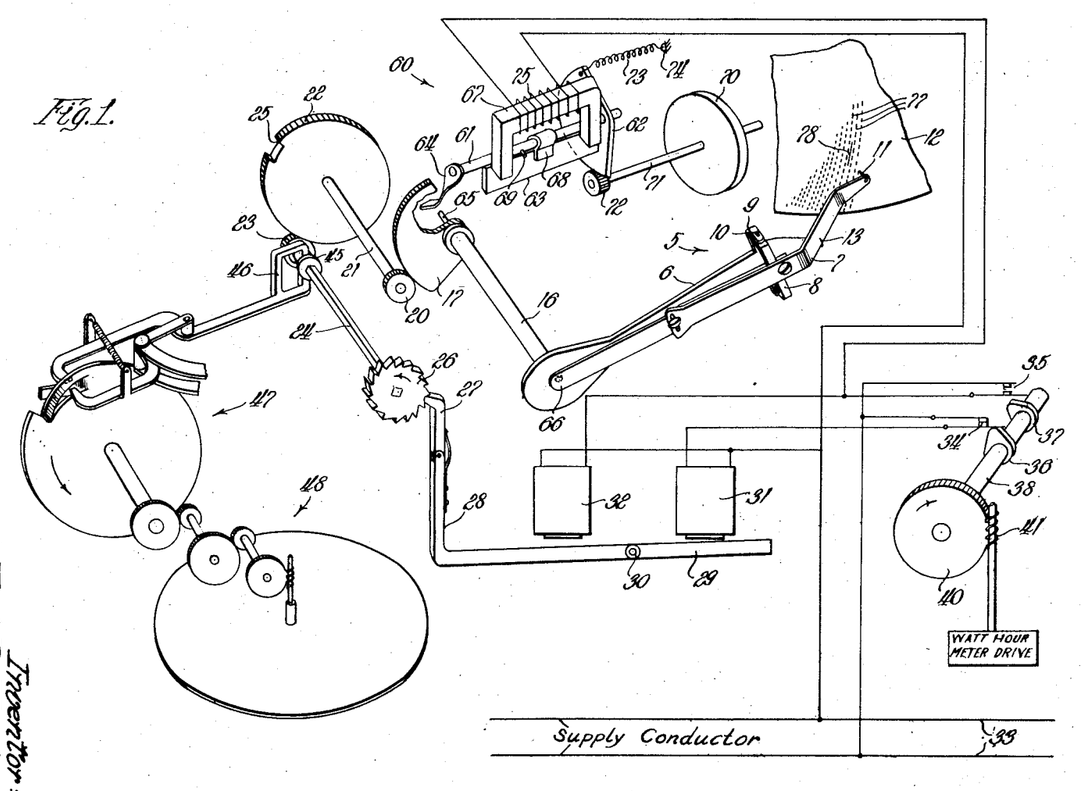
Figure 1 illustrates diagrammatically one embodiment of my invention.

Referring now to Figure 1 of the drawings, in connection with which one embodiment of my invention will be described, recording means are shown generally at 5 comprising an advanceable member 6 and a recording member 7. The recording member 7 is carried on a yoke 8 which interfits with a yoke 9 carried on the advanceable member 6. A pin 10 passes through the interfitting yokes 8 and 9 about which the yoke 8 and the recording member 7 carried thereby are rotatable. The recording member 7 carries a pointer or stylus 11 which is adapted to strike against a recording chart 12. A coil spring (not shown) is carried around the pin 10 between the sides of the yokes 8 and 9. This coil spring is so adapted that it normally holds the recording member 7 and pointer 11 away from the recording chart 12. One end 13 of the coil spring is shown hooked to the recording member 7. Since the manner in which the advanceable member 6 is advanced from its starting position and returned thereto forms no part of my invention, it will only be briefly described. The advanceable member 6 is carried on one end of a hollow shaft 16 and a segment gear 17 is carried on the opposite end. A pinion 20 carried on a shaft 21 may be provided to drive the segment gear 17. The shaft 21 may also carry a gear 22 adapted to be driven by a pinion 23 slidably carried on a square shaft 24. A section of the teeth of the gear 22 may be cut out as indicated at 25, thereby preventing the gear 22 from being driven by the pinion 23 beyond this section. A ratchet wheel 26 is secured to the shaft 24 and may be driven by a pawl 27. The pawl 27 is carried on one leg of an angle member 28, having an armature member 29 carried on the other leg. The armature 29 is rotatably mounted at 30 and is adapted to be alternately attracted to one or the other of a pair of electromagnets 31 and 32. The electromagnets 31 and 32 are connected for energization to a pair of energized conductors 33 through pairs of contacts 34 and 35, respectively. The contacts 34 and 35 are normally open and are adapted to be closed by cams 36 and 37, respectively, carried on a shaft 38. The cam 36 is angularly in advance of the cam 37 so as to close the contacts 34 previous to the closing of the contacts 35. A worm gear 40 is carried by the shaft 38 which is driven by a worm 41. The worm 41 is driven, as indicated, by a watt-hour meter.

The manner in which the advanceable member 6 is advanced will be seen to be as follows: The worm 41, and thereby the cams 36 and 37, is driven at a speed proportional to the rate at which electrical power is being supplied. Upon rotation of the shaft 38 and the cams 36 and 37 carried thereby the contacts 34 will first be closed, causing the electromagnet 31 to be energized. Upon energization of the electromagnet 31 the armature 29 is attracted thereto and the pawl 27 will be pulled down behind one of the teeth on the ratchet wheel 26. Upon further rotation of the shaft 38 the contacts 34 will open and the contacts 35 will be closed. As soon as the contacts 34 are opened, the electromagnet 31 will be deenergized, allowing the armature 29 to be attracted to the electromagnet 32 which is energized on the closing of the contacts 35. When the armature 29 is attracted to the electromagnet 32, the pawl 27 will be lifted, thereby rotating the ratchet wheel 26 in a counterclockwise direction as indicated by the arrow thereon. The rotation of the ratchet wheel 26 will be transferred through the pinion 23, gear 22, pinion 20, segment gear 17, to the advanceable member 6, causing it to be rotated in a counterclockwise direction.

That part of the advancing mechanism comprising the ratchet wheel 26, pawl 27, angle member 28, armature 29, electromagnets 31 and 32, cam shaft 38 carrying cams 36 and 37 and worm gear 40, may be termed a cyclically operable driving mechanism. That is, it is the driving means operatively interconnecting the worm 41 with the advanceable member 6. When the cam 37 is on top, contacts 35 are closed, electromagnet 32 is energized, and the armature 29 is attracted thereto, the cyclically operable driving mechanism may be said to have just completed its advancing phase. That is, in this phase an advance of the advanceable member 6 and the recording member 7 carried thereon has just been completed.

In order that the advanceable member 6 may be periodically returned to its starting position to again be advanced therefrom, the pinion 23 is slidably mounted on the square shaft 24 and is adapted to be slid into and out of mesh with the gear 22, thus disconnecting the gear train comprising pinion 23, gear 22, pinion 20, and segment gear 17. A collar 45 is integrally formed with the pinion 23, and a fork 46 may be provided to fit in the collar 45. The fork 46 is operated by trip means, shown generally at 47, which are in turn operatively connected to timing means shown generally at 48. The trip means and timing means 47 and 48, respectively, are fully described in Patent No. 1,331,915, and therefore no further description thereof will be set forth herein. It is sufficient to say that the trip means 47 driven by the timing means 48 periodically operates the fork 46 so as to slide the pinion 23, on the shaft 24, out of mesh with the gear 22. The trip means 47 are so adapted that the advanceable member 6 will have time to fall and return to its starting position before the pinion 23 is again slid into mesh with the gear 22. The length of the period during which the pinion 23 is out of mesh with the gear 22 varies from eight to twenty-five seconds, depending upon the design of the particular demand meter. The timing means 48 may be adapted to drive the trip means 47 so that the pinion 23 is moved out of mesh with the gear 22 and the meter is tripped every thirty minutes, which may constitute a demand interval. It will be seen then that the advanceable member 6 and the recording member 7 carried thereby are advanced a distance each thirty minutes proportional to the amount of electrical power consumed and, after each thirty minutes, are returned to the starting position to advance during a subsequent thirty minute period.

Figures 2, 3, 3A, 3B:
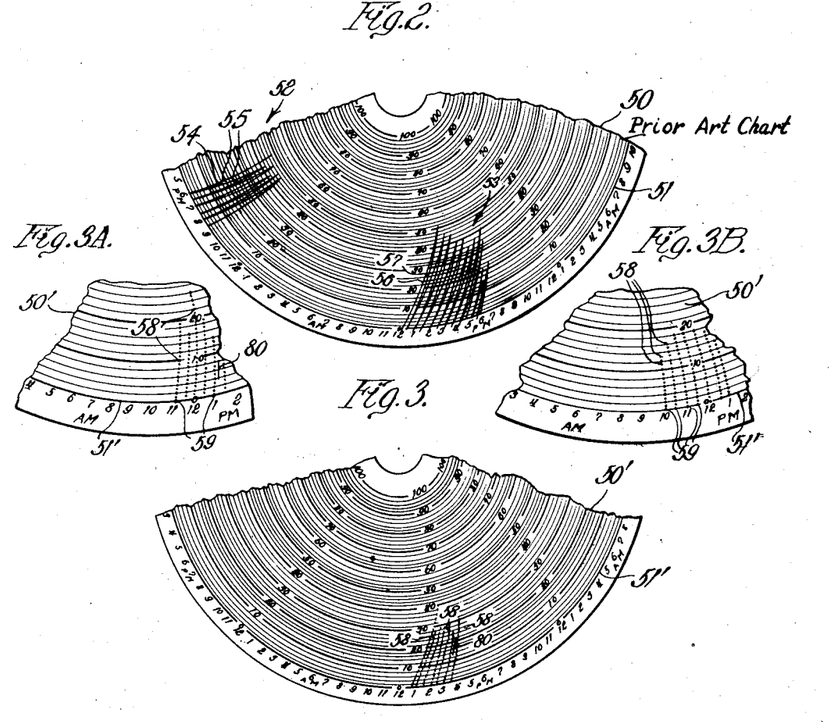
Figure 2 shows a section of a demand chart produced by a demand meter of the prior art referred to above.
Figure 3 shows a section of a demand chart produced by a demand meter of the embodiment illustrated in Figure 1.
Figure 3A shows an enlarged section of the record made on the chart of Figure 3.
Figure 3B shows an enlarged section of the record made by another embodiment of my invention illustrated in Figure 5.

For a clearer understanding of the nature of my invention, the manner in which the advance of the advanceable member 6 has previously been recorded on the recording chart 12 will now be described. Heretofore, the pointer 11 was carried by the advanceable member 6 or an extension thereof, and was adapted to continually bear lightly against the recording chart 12. Accordingly, a full line is drawn when the member 6 is advanced, and another full line is drawn when it returns to the starting position. The character of the record made is clearly shown in connection with Figure 2 of the drawings. In Figure 2, part of a demand chart 50 is shown having concentric circles equally spaced apart and scaled to read in kilowatt hours, while the zero circle 51 is divided into thirty-minute time segments. In operation, the time chart 50 is driven in a clockwise direction. Two portions of the record made on the chart 50 of the advance and return of the advanceable memebr 6 are shown generally at 52 and 53. In the portion 52, the advances of the advanceable member 6 for each thirty-minute interval are indicated by the full lines 54 while the returns thereof are indicated by the lines 55. In the portion of the record 53, the advances are indicated by the full lines 56, and the returns by the lines 57. For reasons that have already been set forth generally and which will be set forth more specifically hereinafter, such a method of recording the advance of the advanceable member 6 is unsatisfactory. Accordingly, reference may again be had to Figure 1 in connection with which my improvement will now be specifically described.

As stated hereinbefore, spring means, the end 13 of which is attached to the recording member 7, normally holds the recording member 7 and the pointer 11 carried thereby out of contact with the recording chart 12. In order that the recording member 7 may be moved into recording position, i. e., to carry the pointer 11 against the chart 12, actuating means, shown generally at 60, are provided. The actuating means 60 comprise a rotatable shaft 61 carrying a segment gear 62, an armature 63, and an arm 64. A free pin 65 is provided in the hollow shaft 16 which can be pushed through the hollow shaft and through an opening in the advanceable member 6 to rotate the end 66 of the recording member 7 outwardly, causing the end of the pointer 11 to strike against the recording chart 12. With a view to causing the rotation of the shaft 61, an electromagnet 67 is provided which, upon energization, attracts the armature 63 thereto. The armature 63 is supported on the shaft 61 by a loosely fitting collar 68 which allows the shaft 61 to rotate freely therewithin. A pin 69 is carried by the shaft 61 against which the armature 63 bears when it is attracted to the electromagnet 67, thereby rotating the shaft 61 therewith. The armature 63 normally hangs in a vertical position, as shown, and when attracted, does not engage the pin 69 until after moving part way up towards the electromagnet 67. When the shaft 61 is rotated through an angle equal to that through which the armature 63 is rotated when it is attracted to the electromagnet 67, the arm 64 will not be rotated sufficiently to push the pin 65 far enough to cause the pointer 11 to strike the recording chart 12. In order that the shaft 61, and thereby the arm 64, may be further rotated, an inertia wheel 70, carried on a shaft 71, is geared to the segment gear 62 by a pinion 72. When the armature 63 is attracted to the electromagnet 67, enough momentum will be given to the inertia wheel 70 so that it will carry the shaft 61 and arm 64 through a greater angle than that which the armature 63 is rotated, thereby causing the arm 64 to push the free pin 65 sufficiently so as to cause the pointer 11 to strike against the recording chart 12. In order that the actuating means 60 may be returned to its starting position after the armature 63 has been attracted to the electromagnet 67, a spring 73 is connected to the segment gear 62 and to part of the meter frame as indicated at 74. Upon deenergization of the electromagnet 67, the spring 73 will return the elements of the actuating means 60 to their original position.

The action of the actuating means 60 is correlated with the operation of the demand meter as follows: The coil 75 of the electromagnet 67 is connected for energization to the energized conductors 33 through the contacts 35. Accordingly, the electromagnet 67 will be energized concurrently with the electromagnet 32. It will be recalled that upon energization of the electromagnet 32, the armature 29 is attracted thereto, causing the advance of the ratchet wheel 26 and thereby the advance of the advanceable member 6 and the recording member 7 carried thereby. The elements of the actuating means 60 are so arranged and designed that sufficient time delay is secured on the energization of the electromagnet 67 to allow each advance of the recording member 6 to be completed before the pointer 11 strikes against the recording chart 12. The time delay can be adjusted by varying either the position of the arm 64, the armature 63, the pin 69, or the length of the pin 65. Thus a dot is made on the recording chart 12 immediately after each advance of the advanceable member 6.

The recording chart 12 is preferably of the type in which a thin layer of white wax covers a black or other colored surface. When the end of the pointer 11 strikes against such a chart, the wax layer will be penetrated and a black point or dot will be made as shown at 77. Any other desired type chart may be used.

In demand meters of previous construction in which a pointer was carried by the advanceable member 6 or an extension thereof, and continually bore against the recording chart 12, the advance of the advanceable member 6 during a given period was recorded as full lines, i. e., like lines 54 and 56 in Figure 2, on the chart 12. In the operation of a demand meter embodying my invention, the pointer 11 will strike against the chart 12 momentarily after each advance of the advanceable member 6. Accordingly, the advance of the advanceable member 6 is recorded on the chart 12 as a series of points or dots, as shown at 77. If the electromagnet 67 is energized while the advanceable member 6 is returning, a short line 78 will be drawn on the recording chart 12. However, this happens only occasionally.

It will be apparent that, since the shaft 38 is driven by the worm 41 connected to a watt-hour drive, the number of times the contacts 34 and 35 are closed during a given period is proportional to the amount of power supplied during this given period. In turn, the electromagnet 32 and the electromagnet 67 will be energized upon each closing of the contacts 35, and the number of energizations thereof will also be proportional to the power supplied during a given period. When the pinion 23 is in mesh with the gear 22 and the advanceable member 6 is thereby in driving relationship with the ratchet wheel 26, the distance which the advanceable member 6 is advanced during a given period will be directly proportional to the number of energizations of the electromagnet 32 and, therefore, directly proportional to the power supplied during the given period. As hereinbefore stated, the trip means 47 cause the pinion 23 to be slid out of mesh with the gear 22 after a predetermined period, usually thirty minutes, allowing the advanceable member 6 to be returned to its starting position.

With a view to more clearly understanding my invention, reference may now be had to Figures 2, 3, and 3A of the drawings. In Figure 2, a recording chart produced on a demand meter of previous construction is shown as previously set forth. In Figure 3, a portion of a recording chart 50' made on a demand meter embodying my invention is shown. On chart 50 (Figure 2), advances of the advanceable member 6 are shown as full lines 54 and 56. The advances are shown on chart 50' (Figures 3 and 3A) as dotted lines 58. It will be noted that the dots making up the lines 58 are arranged in an orderly fashion, a dot occurring approximately on each concentric circle and one midway between concentric circles. Normally, the first dot formed during a period occurs midway between the zero line or circle 51' and the next inner concentric circle. However, if the contacts 35 are closed and the electromagnet 67 is energized during the inactive period when the pinion 23 is out of mesh with the gear 22 and the advanceable member 6 has returned to the starting position, lower dots 59 will be formed. Upon the occasional energization of the electromagnet 67 when the advanceable member 6 is returning to the starting position, a short line 80 is drawn on the chart 50'. In order to read the demand in a thirty-minute period from the chart 50 (Figure 2), it is necessary to determine the end of the corresponding line 54 or 56 drawn during that period, it being impossible to take into account any advance of the advanceable member 6 called for by the closing of the contacts 35 during the inactive period. When it is desired to read the demand of any period from the chart 50' (Figures 3 and 3A), it is only necessary to count the number of points or dots occurring in the line 58 corresponding to that period and to add to this number any line 80 drawn during the return period. Since each one of the points or dots in a line 58 is brought about by the closing of the contacts 35, it is only necessary to multiply the total number of points in a given period by the proper factor which is equal to the power supplied during each rotation of the shaft 38. In other words, each rotation of the shaft 38 is clearly recorded on the chart 50', while on the chart 50 the number of rotations of the shaft 38 is proportional to the length of the line 52, except for any rotation made during the inactive period when the pinion 23 is out of mesh with the gear 22.

Figure 4:
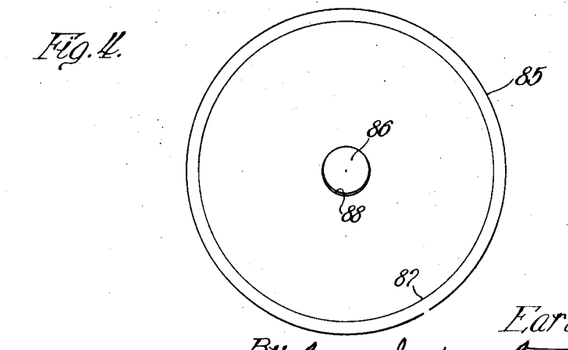
Figure 4 shows the zero line and center opening of a recording chart.

Referring to Figure 4 of the drawings, the outline of a recording chart 85 is shown having a center opening 86 and a zero line 87. When placed on a meter, the chart 85 has the opening 86 placed over a hub driven by a timing means and means are provided to tightly press the chart 85 against a flange on the hub to cause rotation of the chart 85 with that of the hub. Assuming that the chart 85 is to be used as the chart 12 of Figure 1, the position of the pointer 11 is adjusted so that in the starting position of the advanceable member 6 the pointer will rest on the zero line 87. Although the starting position of the advanceable member 6 and the pointer 11 is always the same, it is impossible to make the chart 85 so accurate that the zero line 87 will always coincide with the starting position of the pointer 11. The opening 86 may also be off center, as indicated at 88, and/or the center of the zero line 87 may not coincide with the center of the opening 86. It will be understood that these charts 85 are fairly accurate, but it is not possible to go beyond certain allowable and practical tolerances in their production. It will be apparent that, when the advance of the advanceable member 6 is recorded as a full line 54 or 56, as shown on the chart 50, if the starting position of the pointer 11 does not coincide with the zero line 51, the end of the line drawn for the period will be either too high or too low, according to whether the starting position is above or below the zero line 51. As will be seen in Figure 2, in the recorded portion 53 the lines 56 all have their starting points below the zero line 51. The portions of the lines 56 which occur below the zero line 51 cause these lines to be a correspondingly amount shorter above the zero line. Accordingly, the demand readings for these periods will be inaccurate and less than the actual time demands. In the recorded portion 52, the lines 54 start at the zero line 51, and, in this respect, this portion will be correct.

There are two more factors which contribute materially to the difficulty in obtaining an accurate reading from the recording chart 50. These factors have been termed "whip" and "back-lash." This is the motion of the pointer 11 in a forward or reverse direction due to momentum and in excess of the proper degree of motion. "Whip" and "back-lash" are of no consequence whatsoever in a demand meter embodying my invention.

Referring to Figures 3 and 3A, it will be observed that it is not highly important or necessary to have the starting position of the pointer 11 coincide with the zero line 51', so long as it is fairly close. And the starting position of the pointer 11 can be readily made to coincide accurately enough with the time divisions of the zero line 51' so that there will be no doubt as to the period in which a dotted line 58 occurred. In fact, it is only necessary that the chart 50' be provided with a zero line 51', although a full scaled chart makes reading easier.

It will be seen that both in the embodiment of my invention illustrated in Figure 1 of the drawings and in the demand meters of the prior art disclosed in Patents No. 1,331,915 and No. 1,603,050, the fraction of the demand occurring at the end of one period after the last advance of the advanceable member 6 may be recorded as part of the demand of the next succeeding period. Accordingly, there is the occasional possibility of a greater demand being recorded for a period than is actually supplied. Such an occurrance may be brought about as follows:

It will be noted that the cyclically operable driving mechanism, hereinbefore set forth, goes through its cycle of operation irrespective of whether the demand meter is in its inactive period or not. Also, it will be seen that a certain uniform increment of demand must be supplied to the watt-hour meter before that increment is recorded by an advance of the advanceable member 6. It would only be a coincidence if the trip means 47 should disengage the pinion 23 just at the instant that the last advance of the advanceable member 6 and a dot had been made. Therefore, at the end of a period when the advanceable member returns to its starting position, there will already be in the watt-hour meter a fraction of the increment requisite for another advance of the advanceable member 6. Accordingly, in order for the first advance of the advanceable member 6 to be made in the next succeeding period, it is only necessary for the balance of the increment to be supplied. In effect, this is recording part of the demand made in one period in the next successive period. In the embodiment of my invention illustrated in Figure 5 of the drawings, such a possibility is entirely prevented.

Figure 5:
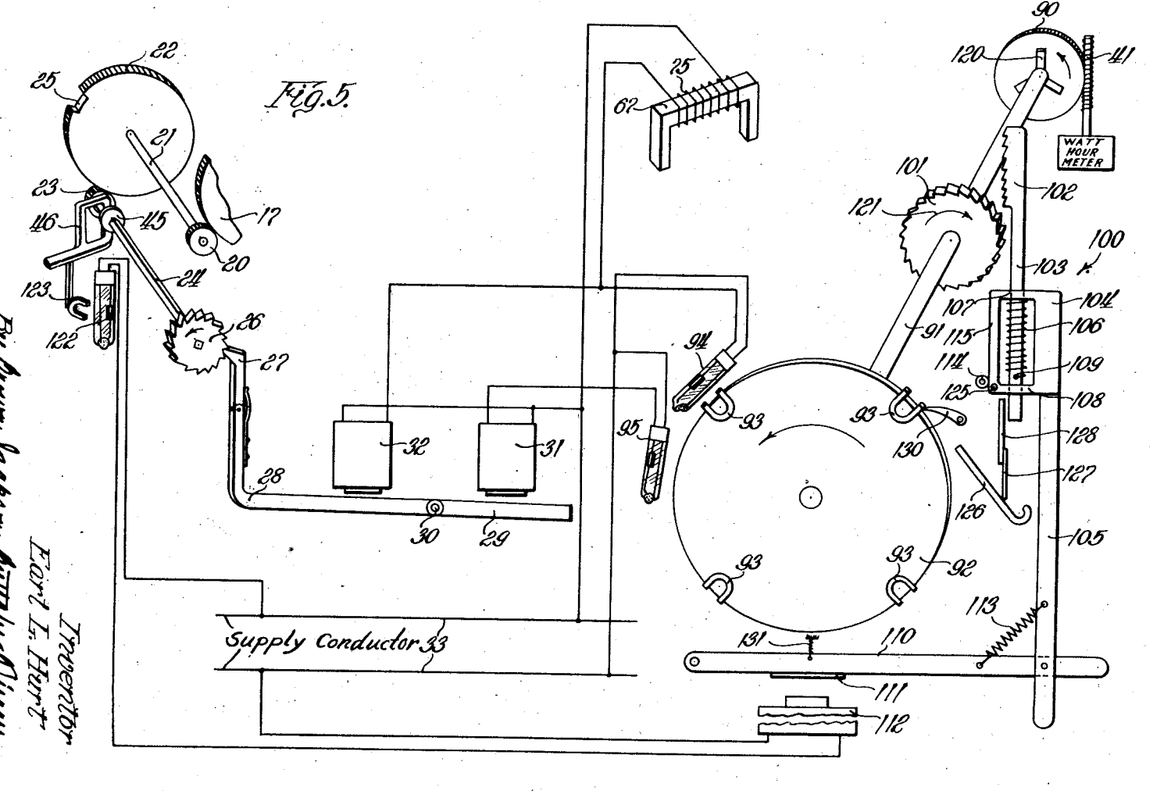
Figure 5 illustrates diagrammatically another embodiment of my invention.

Referring now particularly to Figure 5 of the drawings, an embodiment of my invention will be described which entirely prevents the recording part of the demand of one period in the next succeeding period. The embodiment of my invention shown in Figure 5 is exactly analogous to that shown in Figure 1 except that a different cyclically operable driving mechanism is employed. The operation of the embodiments shown in both Figures 1 and 5 are essentially the same. Accordingly, only enough of the demand meter mechanism has been shown in Figure 5 to illustrate the functioning of the different cyclically operable driving mechanism.

It will be apparent that in order to prevent the recording of part of the demand occurring in one period in with that of the next successive period, the cyclically operable driving mechanism must be reset to that phase of its cycle which corresponds to the recording of one of the uniform increments of demand. Referring to Figure 1 of the drawings, it will be observed that such a phase of the cyclically operable driving mechanism occurs when the cam 37 is on top and the contacts 35 are closed. In this phase the advanceable member 6 has just advanced and a dot has been made to indicate the supply of one uniform increment of commodity to the watt-hour meter. Thus, in order to prevent the recording of a fraction of the demand occurring at the end of one period with that of the succeeding period, it is only necessary to reset the cyclically operable driving mechanism in the above-mentioned phase each time the trip means 47 disengage the pinion 23, allowing the advanceable member 6 to return to its starting position.

In Figure 5 a worm gear 90, corresponding to the worm gear 40 in Figure 1, is mounted on a shaft 91 and is driven by the worm 41. A disc 92 is also mounted on the shaft 91 on the periphery of which four small permanent horseshoe magnets 93 are carried spaced 90 degrees apart. Two magnetically operated switches 94 and 95 are located as shown adjacent to the periphery of the disc 92. The switches 94 and 95 may be such as those commercially known as "mercoid switches", or their equivalent. The switches 94 and 95 are normally open and will be closed only when one of the magnets 93 passes adjacent thereto. The switch 94 corresponds to contacts 35 (Figure 1), and the switch 95 corresponds to contacts 34 (Figure 1). That is, when the switch 94 is closed, the electromagnets 32 and 67 will be energized, causing the advance of the advanceable member 6 (Figure 1) and the actuation of the actuating means 60 (Figure 1). When the switch 95 is closed, the electromagnet 31 will be energized, attracting the armature 29 thereto and bringing the pawl 27 down behind one of the teeth of the ratchet wheel 26. The magnets 93 move in a circular path, one of them first coming adjacent to switch 94 to advance the demand meter and then passing adjacent to the switch 95 to reset it. It will be observed that since the disc 92 carries four magnets 93, one quarter of a revolution of the shaft 91 corresponds to a full revolution of the shaft 38 (Figure 1). It will be apparent that the gear ratio between the worm drive 41 may be varied as desired, according to the number of magnets 93 mounted on the disc 92. It will thus be seen that normally the cyclic operations of the cyclically operable driving mechanisms of Figures 1 and 5 are substantially the same.

The above-mentioned phase of the cycle which corresponds to the supply of one uniform commodity increment will be seen to correspond to that position of the disc 92 when one of the magnets 93 is adjacent to the switch 94. As stated above, in order to prevent any fraction of the demand supplied at the end of one period from being recorded with that of the succeeding period, the cyclically operable driving mechanism must be reset to the above-mentioned phase, i. e., a magnet 93 being adjacent to the switch 94. In order to so reset the cyclically operable driving mechanism, a resetting mechanism, indicated generally at 100, is provided. The resetting mechanism 100 comprises a pinion 101 carried on the shaft 91, and a rack 102 is provided to operate therewith. An extension 103 of the rack 102 is slidably carried in bracket 104 integrally formed on a member 105. A coil spring 106 is disposed about the extension 103 between the upper and lower arms 107 and 108, respectively, of the bracket 104. The coil spring 106 is of greater diameter than that of the holes in the arms 107 and 108 through which the extension 103 fits, and the lower end of the coil spring 106 is fastened to a pin 109 on the extension 103, which stops the downward movement of the extension 103 through the bracket 104. The member 105 is pivotally connected with another member 110 which carries an armature 111 adapted to be attracted to an electromagnet 112. A coil spring 113 pulls the member 105 inwardly. Normally, the elements being reset are in the relative positions shown in the drawings. It will be observed that the teeth of the rack 102 are normally well above those of the pinion 101. A roller 114 is provided to prevent the extension 103 from being pulled against the pinion 101. The side 115 of the bracket 104 will run smoothly against the roller 114.

Since the worm drive 41 driven by a watt-hour meter is continually driving and should preferably not be stopped, the shaft 91 is connected in friction driving relationship with the worm gear 90 by means of a spider clutch 120. The total friction provided by the clutch 120 is such that the shaft 91 will be normally rotated in synchronism with the worm gear 90, but will also allow the rack 102 engaging the pinion 101 to turn the shaft 91 in the opposite direction as indicated by the arrow 121 on the pinion 101.

In order to operate the resetting mechanism 100 at the end of each period, a magnetically operated switch 122 is provided adjacent to the fork 46. A permanent magnet 123 depends from the fork 46 which, when the pinion 23 is slid out of engagement with the gear 22, is carried into a position to close the switch 122. The electromagnet 112 is in series circuit relationship with the switch 122 and is connected for energization with the energized conductors 33, as shown.

With a view to disengaging the rack 102 from the pinion 101 after its downward movement, a pin 125 is provided on the bracket 104 which is adapted to operate against a cam 126. The cam 126 is so shaped that it will carry the bracket 104 and rack 102 away from the pinion 101. In order to prevent the rack 102 from bearing against the pinion 101 when it moves to its upward position, a spring strip 127 is carried on a smooth member 128. When the pin 125 is in the lower end of the cam 126, the spring strip catches, falls behind, and prevents it from following the cam 126 back up.

A pawl 130 is provided to limit the backward rotation of the disc 92 on the operation of the resetting mechanism 100. The pawl 130 will allow the disc 92 to be rotated backwardly until a magnet 93 is adjacent to the switch 94.

The operation of the resetting mechanism 100 will be seen to be as follows: When the trip means 47 (Figure 1) slides the pinion 23 out of engagement with the gear 22 at the end of a period, the switch 122 will be closed and the electromagnet 112 thereby energized. On energization of the electromagnet 112, the armature 111 will be attracted thereto, carrying with it the member 110. The bracket 104 and member 105 will move downwardly with the member 110 until the pin 125, provided on the bracket 104, reaches the lower end of the cam 126. On the downward movement of the bracket 104, the arm 107 compresses the coil spring 106, thereby pulling the rack 102 downwardly. On moving down, the teeth of the rack 102 will engage the teeth of the pinion 101 and rotate the pinion in a direction indicated by the arrow 121. The length of the rack 102 and the amount of downward movement through which it can be pulled are such that the shaft 91 and disc 92 can be rotated backwardly at least 90 degrees. However, the coil spring 106 provided around the extension 103 allows the bracket 104 to move downwardly its full stroke even if it is only necessary for the rack 102 to rotate the shaft 91 backwardly a very small distance. When the pinion 23 is again engaged with the gear 22, the switch 122 will be opened and the electromagnet 112 deenergized. On deenergization of the electromagnet 112, the elements of the resetting mechanism may again be returned to the position shown in the drawings and are ready for another resetting operation. A tension spring 131 attached to the member 110 returns that member and member 105 to their normal position when the electromagnet 112 is deenergized.

Since the cyclically operable driving mechanism shown in connection with Figure 5 is resettable, it may be distinguished from that of Figure 1 by calling it resettable cyclically operable driving mechanism.

It will be noted that on each resetting of the resettable cyclically operable driving mechanism to the position shown in Figure 5, the switch 94 will be closed, thereby causing the energization of the electromagnet 67. Upon energization of the electromagnet 67 the actuating means 60 will be put in operation and the pointer or stylus 11 will strike against the recording chart 12. Since by this time the advanceable member 6 will have returned to its starting position, a dot will be made on the chart 12 corresponding to the lower dots 59 shown in Figure 3A. The type of record made by the embodiment of my invention shown in Figure 5 of the drawings is illustrated in Figure 3B. Instead of an occasional dot 59 being made, a complete row of them will be formed as shown. In reading the maximum demand from the chart shown in Figure 3B made by the embodiment of my invention illustrated in connection with Figure 5, the lower row of dots 59 is disregarded. However, this lower row of dots 59 serves the useful purpose of establishing the relationship between the zero line 51' of the chart and the starting position of the advanceable member 6 or pointer 11. Since it is readily apparent to the meter reader on which type of demand meter the chart shown in Figure 3B was made, no difficulty or confusion will result from the formation of this lower row of dots 59.

Since certain further changes may be made in the foregoing constructions, and different embodiments of the invention may be made without departing from the scope thereof, it is intended that all matter shown in the accompanying drawings or described hereinbefore shall be interpreted as illustrative and not in a limiting sense.

I claim as my invention:

1. Means for recording on a chart driven at a predetermined speed the quantity of commodity supplied during each period of series of successive periods comprising, in combination, recording means adapted to be momentarily moved into engagement with the chart for making thereon a separate and distinct mark each time such movement takes place, actuating means for moving said recording means into engagement with said chart, commodity meter means, resettable cyclically operable means operatively interconnecting said commodity meter means with said actuating means to operate said actuating means each time a definite quantity of commodity has been supplied as measured by said commodity meter means whereby the quantity of commodity supplied during each of said successive periods is exhibited on said chart by the number of unconnected marks made in each period, said resettable cyclically operable means at one phase of its cycle operating said actuating means, and resetting means operatively connected with said resettable cyclically operable means to reset the same to said phase of its cycle at the end of each of said successive periods whereby said recording means is actuated during each period only in accordance with commodity measured during each such period.

2. Means for recording on a chart driven at a predetermined speed the quantity of a commodity supplied during each period of series of succesive periods comprising, in combination, recording means adapted to be momentarily moved into engagement with the chart for making thereon a separate and distinct mark each time such movement takes place, means for advancing said recording means over said chart from a starting point during each of said successive periods, means for returning said recording means to said starting point at the end of each of said successive periods, actuating means for moving said recording means into engagement with said chart, commodity meter means, resettable cyclically operable means operatively interconnecting said commodity meter means with said actuating means to operate said actuating means each time a definite quantity of commodity has been supplied as measured by said commodity meter means whereby the quantity of commodity supplied during each of said successive periods is exhibited on said chart by the number of unconnected marks made in each period, said resettable cyclically operable means at one phase of its cycle operating said actuating means, and resetting means operatively connected with said resettable cyclically operable means to reset the same to said phase of its cycle at the end of each of said successive periods whereby said recording means is actuated during each period only in accordance with commodity measured during each such period.

3. Means for recording on a chart driven at a predetermined speed the quantity of commodity supplied during each period of a series of successive periods comprising in combination, an advanceable member, recording means advanced over said chart in synchronism with said advanceable member, commodity meter means, resettable cyclically operable driving means operatively interconnecting said advanceable member with said commodity meter means whereby said advanceable member is advanced from a starting point during each of said successive periods in step-by-step manner, each step advance occurring when a definite quantity of commodity has been supplied, said resettable cyclically operable driving means at one phase of its cycle advancing said advanceable member, trip means operatively connected with said advanceable member for returning it to said starting point at the end of each of said successive periods, and resetting means operatively connected with said resettable cyclically operable driving means for resetting the same to said phase at the end of each of said successive periods.

4. Means for recording on a chart driven at a predetermined speed the quantity of commodity supplied during each period of a series of successive periods comprising in combination, an advanceable member, recording means advanced over said chart in synchronism with said advanceable member and adapted to be momentarily moved into engagement with the chart for making thereon a separate and distinct mark each time such movement takes place, commodity meter means, resettable cyclically operable driving means operatively interconnecting said advanceable member with said commodity meter means whereby said advanceable member is advanced from a starting point during each of said successive periods in step-by-step manner, each step advance occurring when a definite quantity of commodity has been supplied, said resettable cyclically operable driving means at one phase of its cycle advancing said advanceable member, trip means operatively connected with said advanceable member for returning it to said starting point at the end of each of said successive periods, resetting means operatively connected with said resettable cyclically operable driving means for resetting the same to said phase at the end of each of said successive periods whereby said advanceable member is advanced during each period only in accordance with the commodity measured during such period, actuating means for moving said recording means into engagement with the chart for each step-by-step advance of said advanceable member, and means operatively interconnecting said commodity meter means with said actuating means to operate said actuating means each time said advanceable member is advanced whereby the quantity of commodity supplied during each of said successive periods is exhibited on said chart by the number of regularly spaced unconnected marks made in each period.

5. Means for recording on a chart driven at a predetermined speed the quantity of commodity supplied during each period of a series of successive periods comprising, in combination, an advanceable member, recording means advanced over said chart in synchronism with said advanceable member and adapted to be momentarily moved into engagement with the chart for making thereon a separate and distinct mark each time such movement takes place, commodity meter means, resettable cyclically operable driving means operatively interconnecting said advanceable member with said commodity meter means whereby said advanceable member is advanced from a starting point during each of said successive periods in step-by-step manner, each step advance occurring when a definite quantity of commodity has been supplied, said resettable cyclically operable driving means at one phase of its cycle advancing said advanceable member, trip means operatively connected with said advanceable member for returning it to said starting point at the end of each of said successive periods, resetting means operatively connected with said resettable cyclically operable driving means for resetting the same to said phase at the end of each of said successive periods whereby said advanceable member is advanced during each period only in accordance with the commodity measured during such period, actuating means for moving into engagement with said chart said recording means for each step-by-step advance of said advanceable member, time delay means operatively connected with said actuating means, and means operatively interconnecting said commodity meter means with said actuating means to operate said actuating means each time said advanceable member is advanced, whereby the quantity of commodity supplied during each of said successive periods is exhibited on said chart by the number of regularly spaced unconnected marks made in each period, said time delay means delaying the making of each mark on said chart until after each advance of said advanceable member.

6. Apparatus for recording on a chart driven at a predetermined speed the quantity of a commodity supplied during each interval of a series of equal intervals comprising, in combination, commodity meter means, an advanceable member, means operatively interconnecting said commodity meter means and said advanceable member for advancing the latter relative to said chart from a zero position thereon in accordance with the amount of the commodity, means for resetting said advanceable member to the zero position at the end of each interval, recording means carried by said advanceable member and adapted to be momentarily moved into and then out of engagement with the chart for making thereon a separate and distinct mark each time such movement takes place, and means controlled by said commodity meter means for momentarily moving said recording means into engagement with said chart and then out of engagement therewith each time that said commodity meter means has measured a predetermined amount of the commodity whereby the quantities of said commodity supplied during the intervals are exhibited by the numbers of the marks in lines extending from the zero position on the chart.

7. Apparatus for recording on a chart driven at a predetermined speed the quantity of a commodity supplied during each interval of a series of equal intervals comprising, in combination, commodity meter means, an advanceable member, means operatively interconnecting said commodity meter means and said advanceable member for advancing the latter relative to said chart from a zero position thereon in accordance with the amount of the commodity, means for resetting said advanceable member to the zero position at the end of each interval, recording means carried by said advanceable member and adapted to be momentarily moved into and then out of engagement with the chart for recording thereon a separate and distinct mark each time such movement takes place, an electromagnet, an armature for said electromagnet arranged when attracted thereby to momentarily move said recording means into recording position, and means controlled by said commodity meter means for energizing said electromagnet each time that the former has measured a predetermined amount of the commodity whereby the quantities of said commodity supplied during the intervals are exhibited by the numbers of the marks in lines extending from the zero position on the chart.

8. Apparatus for recording on a chart driven at a predetermined speed the quantity of a commodity supplied during each interval of a series of equal intervals comprising, in combination, commodity meter means, an advanceable member, means operatively interconnecting said commodity meter means and said advanceable member for advancing the latter in step-by-step manner relative to said chart from a zero position thereon in accordance with the amount of the commodity, means for resetting said advanceable member to the zero position at the end of each interval, recording means carried by said advanceable member and adapted to be momentarily moved into and then out of engagement with the chart for making thereon a separate and distinct mark each time such movement takes place, an electromagnet, an armature for said electromagnet arranged when attracted thereby to momentarily move said recording means into recording position, means cooperating with said armature and said recording means for delaying movement of the latter into recording position until after each step of said advanceable member has been completed, and means controlled by said commodity meter means for energizing said electromagnet each time that the former has measured a predetermined amount of the commodity whereby the quantities of said commodity supplied during the intervals are exhibited by the numbers of the marks in lines extending from the zero position on the chart.

9. Apparatus for recording on a chart driven at a predetermined speed the quantity of a commodity supplied during each interval of a series of equal intervals comprising, in combination, commodity meter means, an advanceable member, means operatively interconnecting said commodity meter means and said advanceable member for advancing the latter relative to said chart from a zero position thereon in a step-by-step manner, each step corresponding to a predetermined amount of the commodity, means for resetting said advanceable member to the zero position at the end of each interval, recording means carried by said advanceable member and adapted to be momentarily moved into and then out of engagement with the chart for making thereon a separate and distinct mark each time such movement takes place, and means operated together with each step of said advanceable member for momentarily moving said recording means into engagement with said chart and then out of engagement therewith whereby the quantities of said commodity supplied during successive intervals are exhibited by the numbers of said marks in lines extending from the zero position on the chart.

10. Apparatus for recording on a chart driven at a predetermined speed the quantity of a commodity supplied during each interval of a series of equal intervals comprising, in combination, commodity meter means, an advanceable member, means operatively interconnecting said commodity meter means and said advanceable member for advancing the latter relative to said chart from a zero position thereon in a step-by-step manner, each step corresponding to a predetermined amount of the commodity, means for resetting said advanceable member to the zero position at the end of each interval, recording means carried by said advanceable member and adapted to be momentarily moved into and then out of engagement with the chart for making thereon a separate and distinct mark each time such movement takes place, time delay means cooperating with said recording means for delaying movement thereof into position for making the mark until after each advance of said advanceable member, and means operated together with each step of said advanceable member for momentarily moving said recording means into engagement with said chart and then out of engagement therewith whereby the quantities of said commodity supplied during successive intervals are exhibited by the numbers of said marks in lines extending from the zero position on the chart.

11. Apparatus for recording on a chart driven at a predetermined speed the quantity of a commodity supplied during each interval of a series of equal intervals comprising, in combination, commodity meter means, an advanceable member, means operatively interconnecting said commodity meter means and said advanceable member for advancing the latter relative to said chart from a zero position thereon in a step-by-step manner, each step corresponding to a predetermined amount of the commodity, means for resetting said advanceable member to the zero position at the end of each interval, recording means carried by said advanceable member and adapted to be momentarily moved into and then out of engagement with the chart for making thereon a separate and distinct mark each time such movement takes place, an electromagnet, an armature for said electromagnet arranged when attracted thereby to momentarily move said recording means into recording position, and means for energizing said electromagnet for each step of said advanceable member to momentarily operate said recording means whereby the quantities of said commodity supplied during successive intervals are exhibited by the numbers of said marks in lines extending from the zero position on the chart.

12. Means for recording on a chart driven at a predetermined speed the quantity of commodity supplied during each period of a series of successive periods comprising, in combination, recording means adapted to be momentarily moved into engagement with the chart for making thereon a separate and distinct mark each time such movement takes place, actuating means for moving said recording means into engagement with said chart, commodity meter means, resettable cyclically operable means operatively interconnecting said commodity meter means with said actuating means to operate said actuating means each time a definite quantity of commodity has been supplied as measured by said commodity meter means whereby the quantity of commodity supplied during each of said successive periods is exhibited on said chart by the number of unconnected marks made in each period, and resetting means operatively connected with said resettable cyclically operable means to reset the same to the same relative operating position at the end of each of said successive periods whereby said recording means is actuated during each period only in accordance with commodity measured during each such period.

13. Means for recording on a chart driven at a predetermined speed the quantity of commodity supplied during each period of a series of successive periods comprising, in combination, an advanceable member, commodity meter means, resettable cyclically operable driving means operatively interconnecting said advanceable member with said commodity meter means to advance the former from a starting point during each of said successive periods, said driving means including means for advancing said advanceable member in step-by-step manner each step occurring when a definite quantity of commodity has been supplied, trip means operatively connected with said advanceable member for effecting its return to said starting point at the end of each of said successive periods, resetting means operatively connected with said driving means for resetting the same to the same relative operating position at the end of each of said successive periods whereby said advanceable member is advanced during each period only in accordance with the commodity measured during such period, recording means advanced over said chart by said advanceable member in said step-by-step manner, actuating means for moving said recording means into engagement with said chart at each step of advance movement of said advanceable member so that its movement during said periods is indicated on said chart by lines, one line for each period and each line comprising a number of separate and distinct marks, and means operatively interconnecting said commodity meter means with said actuating means to operate the same during each step that said advanceable member is advanced whereby the quantity of commodity supplied during each of said successive periods is exhibited on said chart by the number of regularly spaced unconnected marks making up each line for each period.

EARL L. HURT.